United States Patent [19]
Davis

[11] Patent Number: 5,492,503
[45] Date of Patent: Feb. 20, 1996

[54] VARIABLE-OFFSET, POULTRY DEBONING SYSTEM

[76] Inventor: James F. Davis, 11976 Bells Ferry Rd., Canton, Ga. 30114

[21] Appl. No.: 182,585

[22] Filed: Jan. 18, 1994

[51] Int. Cl.$^6$ .............................. A22B 7/00; A22C 17/04
[52] U.S. Cl. .......................... 452/179; 452/135; 452/165; 452/177
[58] Field of Search .................................... 452/135, 136, 452/165, 177

[56] References Cited

U.S. PATENT DOCUMENTS

| | | | |
|---|---|---|---|
| 1,749,224 | 3/1930 | Ostricher | 209/552 |
| 2,156,771 | 5/1939 | Sadoff | 452/165 |
| 3,166,785 | 10/1962 | Lemmond | 17/44.1 |
| 3,570,050 | 3/1971 | Draper et al. | 17/46 |
| 4,181,228 | 1/1980 | Hashimoto et al. | 209/552 |
| 4,385,419 | 5/1983 | Cantrell | 17/11 |
| 4,716,624 | 1/1988 | Massey, Jr. | 452/165 |
| 4,780,930 | 11/1988 | Sparkia | 452/165 |
| 4,937,918 | 7/1990 | Martin | 452/165 |

FOREIGN PATENT DOCUMENTS 1008772  12/1966  United Kingdom .

OTHER PUBLICATIONS

Drumstick & Thigh Deboning Line Brochure, Globe Machine Co. D & D Manufacturing Co. (Published Prior To Jan. 1993).

*Primary Examiner*—Willis Little
*Attorney, Agent, or Firm*—Louis T. Isaf; R. Stevan Coursey

[57] ABSTRACT

A variable-offset, poultry deboning system having a conveyor fitted with variable-offset, poultry support arms that bend toward the sides of the conveyor and create a two-sided, poultry deboning-conveyor. The support arms are installed so that successive arms turn toward opposite sides of the conveyor. Poultry support fittings, including, but certainly not limited to, deboning cones and half-pads are mounted on the top of each support arm. Support arms that bend toward the same side of the conveyor are fitted alternately with deboning cones and half-pads. However, in one alternative configuration, all support arms are fitted with deboning cones, while in another alternative configuration, all support arms are fitted with deboning half-pads. Additionally, in still other alternative configurations, products-conveyors may be mounted above the conveyor bed or on each side of the conveyor bed.

31 Claims, 8 Drawing Sheets

VARIABLE-OFFSET, POULTRY DEBONING SYSTEM

BACKGROUND OF THE INVENTION

The present invention relates generally to the field of poultry processing and, in its most preferred embodiments, to the field of apparatus and methods for deboning poultry.

Today, poultry products comprise an ever-growing portion of the diet consumed by humans and animals around the world. This growth and the resulting increased demand for poultry products has strained the production capacity of many poultry processing plants. To cope with the limited capacity of their processing facilities and ever-increasing costs, plant owners are searching for new technology that increases production capacity while keeping capital and operating costs at or below current levels.

Poultry products are delivered to the consumer market for human consumption in a variety of popular forms, including, but certainly not limited to, breasts, wings, thighs, legs, and nuggets. These products may originate from a variety of different birds, but more often than not, from chickens or turkeys. To generate such products, a typical poultry processing plant passes a bird through two major processes followed, in turn, by a number of specialized secondary operations. In the first major process, the bird is gutted leaving a carcass consisting of the skeletal structure and the outer portions of the bird. Then, in the second major process, known as deboning, the breasts, wings, thighs, legs, and tenders are removed from the outer portion of the bird.

Deboning is currently accomplished in most poultry processing plants by use of a stainless steel, continuous, deboning-conveyor having a series of vertical posts and deboning horns along its entire length. A second, wider, belt-type, continuous, products-conveyor is positioned alongside and at the same level as the first conveyor. The deboning process begins with a bird carcass being placed over each deboning horn at one end of the deboning-conveyor. As this conveyor transports the carcass toward its other end, the breasts, wings, thighs, legs, and tenders are cut away and removed from the carcass by numerous workers standing on the "free" side of the conveyor. Once removed, the bird portions are placed on the products-conveyor which transports the portions to another location in the plant for specialized, secondary operations. The removal of bird portions continues in this fashion along the length of the deboning-conveyor. By the time the bird carcass reaches the other end of the conveyor, only the skeleton remains and it is knocked off its deboning horn for grinding into meal to be used in animal feed. This apparatus and method form a system that is considered to be conventional by the industry and is described in U.S. Pat. No. 4,385,419 issued to Cantrell.

While conventional systems have increased production throughout the poultry processing industry, there are, however, a number of problems with them. First, the deboning-conveyor can be worked from only one side because the location and size of the products-conveyor precludes access from the opposite side. However, this problem would exist even if the products-conveyor were eliminated or decreased in size because conventional systems are designed to allow workers to access only one bird carcass at at time. More specifically, in a convention system, bird carcasses are transported by mounting posts located in the center of the deboning-conveyor. Workers stand along one side of the deboning-conveyor while the carcasses pass before the workers in "single-file" fashion. Since it would be very dangerous to have two workers (one on each side of the deboning-conveyor) cutting on the same bird carcass, processing could never be done simultaneously from two sides of a conventional system.

Another problem with conventional systems is that a significant amount of floorspace is required to process each bird. Conventional systems require floorspace for a deboning-conveyor, an adjacent products-conveyor, and worker access to one side of the deboning-conveyor. Furthermore, because secondary processing to remove bones and cartilage from thighs and legs is done off-line in a conventional system, additional floorspace is required for the secondary processing equipment, conveyors, and workers.

The effects of these problems combine to adversely affect a plant's overall cost of production. The one-sided nature of a conventional deboning system limits its production capacity per square foot of floorspace and often forces the owners of a processing plant to install multiple deboning systems to achieve a desired level of production. The cost of this additional equipment and floorspace necessary to house it serve to increase a plant's overall cost of production. Of course, other costs are also incurred due to operation and maintenance expenses associated with the additional equipment and floorspace. As if these costs did not increase the cost of production enough, the off-line, secondary processing of thighs and legs required by a conventional system contributes its own share of costs for floorspace, equipment, operation, and maintenance.

Several other problems with conventional deboning systems arise because the straight posts and deboning horns are located in the center of the conveyor and workers must reach out over the conveyor hour after hour to cut and remove portions of a bird. In doing so, the workers may strain their backs and risk more serious injury that may result from getting a finger or clothing caught in the links of the deboning-conveyor. In addition, the centerline location of the deboning horns causes the wrists and forearms of the workers to be subjected repeatedly to non-natural motions and angles as they reach out to cut and remove portions from bird carcasses. As a result, some workers have developed carpal tunnel syndrome and have been forced to miss time from work.

The present invention was developed to solve or mitigate the problems discussed above and may additionally solve or mitigate other problems that become apparent upon reading and understanding this specification.

SUMMARY OF THE INVENTION

Briefly described, the present invention includes an improved system for deboning poultry. More specifically, the present invention includes a deboning-conveyor having a continuous conveyor bed comprised of a plurality of pivotally connected, stainless steel links. However, of primary importance to the system is a multitude of variable-offset, poultry support arms. In accordance with the preferred embodiment of the present invention, the support arms are rigidly attached, for example, by welding to individual links of the conveyor bed so that the support arms are located at regular intervals along the bed's entire length. The support arms rise vertically from their point of attachment with a conveyor link for a distance and then bend toward a side of the deboning-conveyor. After offsetting for a distance, the support arms bend once more, back into the vertical direction and extend for a distance before being capped by a poultry support fitting.

In accordance with the preferred embodiment of the present invention, the support arms are installed so that successive support arms bend alternately toward opposite sides of the deboning-conveyor. Thus, upon inspection of the top of the deboning-conveyor from either the drive end or tail end, the first support arm encountered bends toward one side. Then, the second support arm bends toward the opposite side. Next, the third support arm bends back toward the original side, while the fourth support arm bends back toward the opposite side. This alternating pattern of support arms continues along the entire length of the conveyor bed so that it is similarly seen on the bottom of the deboning-conveyor.

Also of major importance is an innovative poultry support fitting, known as a deboning half-pad, that was designed specifically for the present invention. In accordance with the preferred embodiment of the present invention, a deboning half-pad is a generally rectangular shaped, stainless steel plate with rounded ends on the shorter sides. The plate is bent along a line that extends from the midpoint of one longer side to the midpoint of the opposite longer side. The bend divides the plate into an upper and lower portion. In addition, the plate has a threaded bore centered in the bottom surface of the upper portion that allows the plate to be installed on top of a support arm. When installed, the upper portion of the plate is parallel to the top of the deboning-conveyor, while the lower portion bends downward toward a side of the deboning-conveyor. Because the function of the deboning half-pad of the present invention is to restrain a leg quarter, thigh, or leg of a bird during deboning, the lower portion of the plate contains two, sharp-pointed pegs that are affixed to the plate and allow a bird portion to be "stuck" onto the plate by a worker. The lower portion of the plate also serves as a cutting board for workers to press their knives against while cutting away bone or cartilage from the bird portion restrained by the deboning half-pad.

As previously stated, the variable-offset, poultry support arms are capped with a poultry support fitting. In accordance with the preferred embodiment of the present invention, the support fitting may be, but is certainly not limited to, a deboning half-pad or a deboning cone that is screwed onto the top of the support arm. Those reasonably skilled in the art will readily recognize that the term "deboning cone" is a more common name for a deboning horn. In accordance with the preferred embodiment of the present invention, each support arm is capped, in alternating fashion, with deboning cones and half-pads so that successive pairs of support arms are capped differently. Thus, upon inspection of the top of the deboning-conveyor from either end, if the first pair of support arms that turn toward opposite sides of the deboning-conveyor are fitted with deboning cones, the second pair of support arms will be fitted with deboning half-pads, the third pair with deboning cones, and so on, in a repetitive pattern along the entire length of the conveyor bed. Therefore, the same pattern is seen on the bottom of the deboning-conveyor as well.

The innovative design of the present invention allows the use of an innovative method of poultry deboning. From an operational standpoint, the deboning begins when power is supplied to a motor that is part of a motor-gear box that is, in turn, mounted on one side of the deboning-conveyor at the drive end. The speed of rotation of the motor output shaft is set by a adjusting a variable speed control on the motor so that the desired speed of the conveyor bed is achieved. Viewing the top of the deboning-conveyor, the conveyor bed moves from the tail end toward the drive end. Once the conveyor bed reaches the drive end, it encircles a drive sprocket and heads back along the bottom of the deboning-conveyor toward the tail end. After reaching the tail end of the deboning-conveyor, the conveyor bed encircles another sprocket and then repeats its journey in continuous fashion back toward the drive end. Note that because the support arms are welded to links of the conveyor bed, movement of the conveyor bed causes the support arms and hence, support fittings, to travel in repetitive fashion like the conveyor bed, from the tail end toward the drive end and back again. Movement of the support arms and fittings in this way, brings them before workers standing along opposite sides of the deboning-conveyor.

In accordance with the preferred embodiment of the preferred method of the present invention, a worker stationed at the tail end of the deboning-conveyor places the gutted cavity of a bird carcass over every deboning cone that encircles the end. As the support fittings make their journey toward the drive end along the top of the deboning-conveyor, they pass in front of workers that are positioned on both sides of the conveyor. A worker located on one side of the conveyor performs the same task as a worker standing at the same location on the opposite side of the conveyor. Of course, workers standing at different locations on the same side of the deboning-conveyor perform different tasks.

When viewed from the perspective of the worker standing at a particular location, movement of the conveyor bed causes the worker to be presented in repetitive fashion with pairs of support fittings. In accordance with the preferred embodiment of the preferred method of the present invention, the first fitting in the pair is a deboning cone that supports a bird carcass, while the second fitting in the pair is a deboning half-pad for use in deboning leg quarters, thighs, or legs alone. The worker, in accordance with this new method of processing and the preferred embodiment of the present invention, performs one or more tasks with respect to each support fitting. Thus, the worker first performs one or more tasks on the bird carcass. Typically, such tasks include, but are not limited to: scoring the bird's back; cutting and removing leg quarters, thighs, legs, and wings; pulling breast meat or tenders; and removing skin or fat. By the time the worker finishes, the conveyor bed has advanced enough to bring the deboning half-pad into reach and the worker can then perform one or more tasks with respect to the half-pad. If the half-pad is empty and not restraining a bird portion such as a leg quarter, thigh, or leg, the worker may simply place a portion removed during his task(s) on the bird carcass over the pegs of the half-pad for subsequent deboning and secondary processing. In the alternative, the worker may perform an task totally unrelated to his task(s) on the bird carcass and may simply remove bones or cartilage from a portion already placed on the deboning half-pad by a different worker at an earlier location along the deboning-conveyor.

Once each support fitting pair has passed along the length of the top of the deboning-conveyor, the bird carcass on the deboning cone has been stripped of all usable products and is simply knocked off the cone. In addition, and unlike conventional systems, the thighs and legs of the bird have been deboned on the deboning-conveyor and no off-line, secondary processing is necessary.

The unique incorporation and arrangement of variable-offset, poultry support arms with deboning cones and half-pads in accordance with the preferred embodiment of the present invention creates a two-sided, deboning-conveyor that requires less floorspace than two conventional deboning-conveyors joined side by side. At the same time, these features enable the use of an innovative processing method in which thighs and legs may be removed from a bird's carcass and deboned immediately on the deboning-conveyor instead of being transported to another location in the plant for secondary processing. Use of the present invention will allow a plant owner to increase the production capacity per square foot of plant floorspace while eliminating the need for secondary processing areas and equipment for thighs and legs. As an additional benefit, the plant's overall cost of production should decrease because less equipment and floorspace (and, potentially, labor) are required to produce the same products. Also of significance, is the safer working environment that results from workers no longer having to risk injury as they bend and reach out over a moving conveyor. Additionally, the variable-offset, poultry support arms bring the bird carcass or bird portions closer to the workers, thereby making cutting motions more natural and reducing the opportunity for carpal tunnel syndrome to develop.

In accordance with a first alternate embodiment of the present invention, a products-conveyor is located above and centered over the deboning-conveyor to transport removed portions including, but certainly not limited to, breasts, thighs, legs, and wings, to another location for further processing or packaging. A products-conveyor so located allows workers to remove a portion from a bird's carcass and toss it forward onto the products-conveyor. Likewise, when processing is completed on a portion restrained on a deboning half-pad, workers may remove the portion and toss it forward onto the products-conveyor. The products-conveyor is an industry standard, belt conveyor of the type normally found in the poultry processing industry and is supported periodically along its length by the deboning-conveyor frames. In another alternate embodiment of the present invention, a products-conveyor is centered over the deboning-conveyor, but is suspended from the conveyor support frames so that it "hangs" in between the variable-offset, poultry support arms.

In accordance with a second alternate embodiment of the present invention, two small products-conveyors are employed so that each side of the deboning-conveyor has a products-conveyor located between the deboning-conveyor and the workers. Locating products-conveyors in this way promotes efficient deboning by enabling workers to remove a portion from a bird's carcass or a completed portion from a deboning half-pad and simply drop it onto the products-conveyor below with no wasted effort. Despite the presence of the products-conveyors, the offset nature of the support arms keeps the workers in ergonomically efficient proximity to bird carcasses or portions. The products-conveyors, in turn, transport the portions, including, but certainly not limited to, breasts, thighs, legs, and wings, to another location for further processing or packaging. The products-conveyors are industry standard, belt conveyors of the type normally found in the poultry processing industry and are supported periodically along their length by the deboning-conveyor flames.

In accordance with a third alternate embodiment of the present invention, each variable-offset, poultry support arm is capped with a deboning cone instead of being capped alternately with deboning cones and half-pads. Use of this configuration enables a plant with specialized, secondary processing areas to gain maximum throughput on the two-sided deboning-conveyor of the present invention and thereby, essentially double its production capacity in less floorspace than is required for two conventional deboning-conveyors joined side by side.

In accordance with a fourth alternate embodiment of the present invention, each variable-offset, poultry support arm is capped with deboning half-pad instead of being capped alternately with deboning cones and half-pads. When configured in this way, the deboning-conveyor of the present invention can be used to process thighs and legs, thereby eliminating the need for conventional secondary processing equipment and the floorspace that it requires.

Accordingly, an important object of the present invention is to allow a poultry processing plant to increase its production capacity per square foot of floorspace. This object is made possible by the variable-offset, poultry support arms that extend alternately toward opposite sides of the deboning-conveyor and allow workers to stand on both sides of the same deboning-conveyor. As a result, the production capacity currently achieved from two conventional deboning-conveyors may be achieved from one deboning-conveyor in less floorspace. This capability enables the owner of an existing plant to increase production capacity without adding new space or, in the alternative, to maintain production capacity at current levels with reduced operating expense for equipment, floorspace, utilities, and maintenance. In new plants, this capability enables an owner to achieve a desired level of production capacity with reduced capital outlays for building and equipment.

Another important object of the present invention is to eliminate secondary processing areas for thighs and legs. Through the use of deboning half-pads interspersed between deboning cones, the processing of thighs and legs may be performed on the deboning-conveyor, thereby eliminating the need for separate, specialized processing areas that occupy floor space, consume capital for equipment, and generate operating expense in the forms of additional labor, utility, and maintenance costs.

Yet another important object of the present invention is to improve the working environment for workers standing alongside a deboning-conveyor by reducing the risk of injury in a number of ways. Because the variable-offset, poultry support arms bring a bird's carcass closer to the workers and further away from the links of the moving conveyor, there is less chance of a worker getting a finger or clothing caught in the conveyor. In addition, since less bending and reaching is required of each worker, the risk of back strains and pulled muscles is reduced as well. Also, bringing bird carcasses closer to the workers, arguably, makes cutting motions more natural, thereby reducing the risk of carpal tunnel syndrome.

Other objects, features and advantages of the present invention will become apparent upon reading and understanding the present specification, with the referenced patent specification, when taken in conjunction with the appended drawings.

DETAILED DESCRIPTION OF THE DRAWINGS

Figure 1:
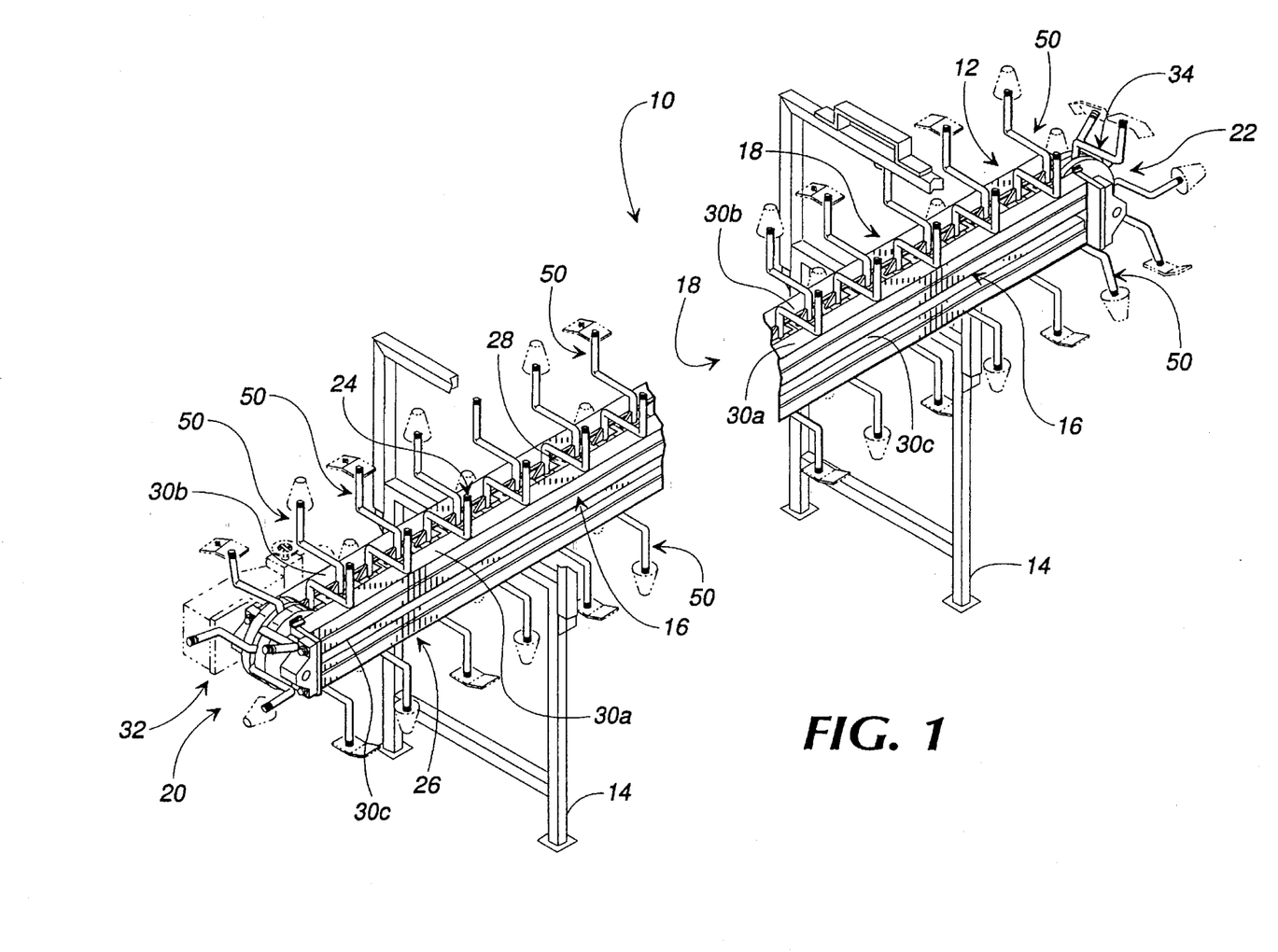
FIG. 1 is a side, perspective view, with the center section cut-away, of a variable-offset, poultry deboning apparatus in accordance with the preferred embodiment of present invention.

Referring now in greater detail to the drawings, in which like numerals represent like components throughout the several views, FIG. 1 is a side, perspective view, with the center section cut-away, of a variable-offset, poultry deboning apparatus 10 in accordance with the preferred embodiment of the present invention. Deboning apparatus 10 includes deboning-conveyor 12 and a number of conveyor support frames 14 located to provide support for deboning-conveyor 12 along its length. Deboning-conveyor 12 is an industry standard, stainless steel, continuous, moving conveyor of the type often found in the food processing industry. In accordance with the preferred embodiment of the present invention, deboning-conveyor 12 includes side 16, side 18, drive end 20, tail end 22, top 24, and bottom 26. Additionally, deboning apparatus 10 includes motor and drive assembly 32 at drive end 20, conveyor bed 28 and wear strips 30 that extend the length of deboning-conveyor 12, and return pulley assembly 34 at tail end 22. FIG. 1 shows a plurality of variable-offset, poultry support assemblies 50 attached at regular intervals along the entire length of conveyor bed 28. While discussed in more detail below, note that consecutive support assemblies 50 offset toward opposite sides 16, 18 of deboning-conveyor 12.

Figure 2:
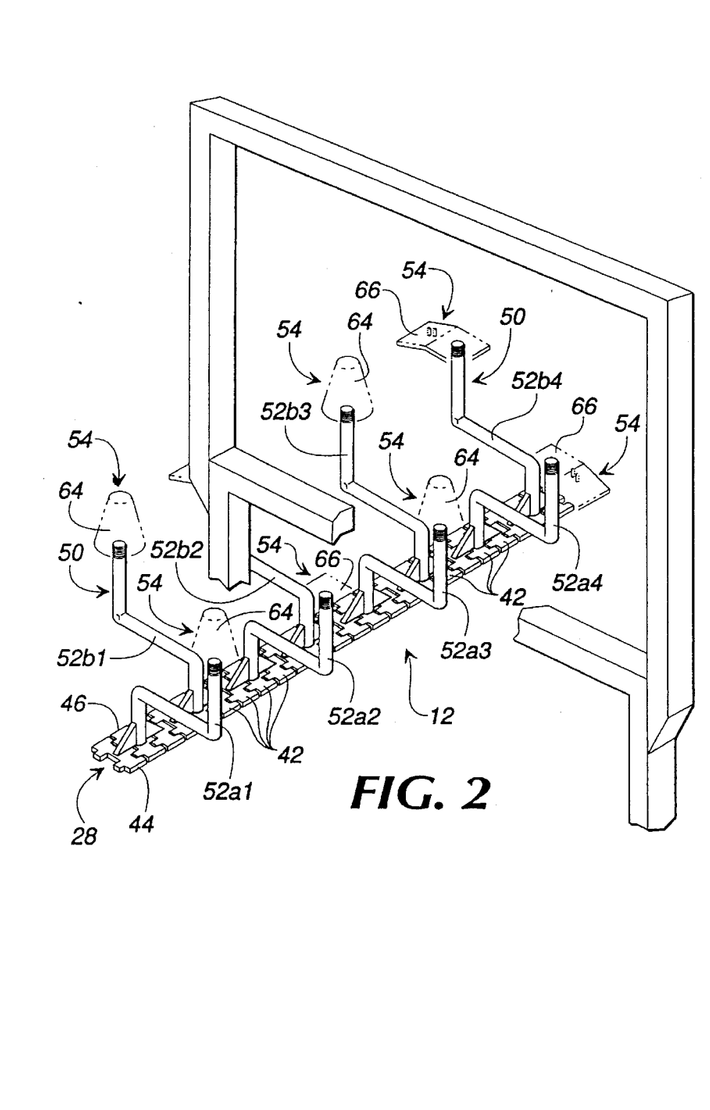
FIG. 2 is an isolated, side, perspective view of a typical section from the top of the deboning-conveyor of FIG. 1.

FIG. 2 is an isolated, side, perspective view of a typical section from the top 24 of deboning-conveyor 12 shown in FIG. 1. In accordance with the preferred embodiment of the present invention, FIG. 2 displays a plurality of variable-offset, poultry support assemblies 50 attached to links 42 of conveyor bed 28. Each support assembly 50 includes a variable-offset, poultry support arm 52 that has an "offset" shape. Support arms 52 are oriented along conveyor bed 28 so that support arms 52a overhang link edge 44, while support arms 52b overhang opposite link edge 46. In addition, each support assembly 50 includes a poultry support fitting 54 connected to a support arm 52. Support fittings 54 are arranged so that support arms 52a1,a2,a3,a4 are fitted alternately with different types of support fittings 54. Likewise, support arms 52b1,b2,b3,b4 are fitted alternately with different types of support fittings 54. In accordance with the preferred embodiment of the present invention, support fittings 54 include, but are not limited to, deboning cones 64 and deboning half-pads 66 shown in more detail in FIG. 6 and 7, respectively. Deboning cones 64 should be known to and understood by those reasonably skilled in the art. However, deboning half-pads 66 were specifically developed for the present invention.

Figure 3:
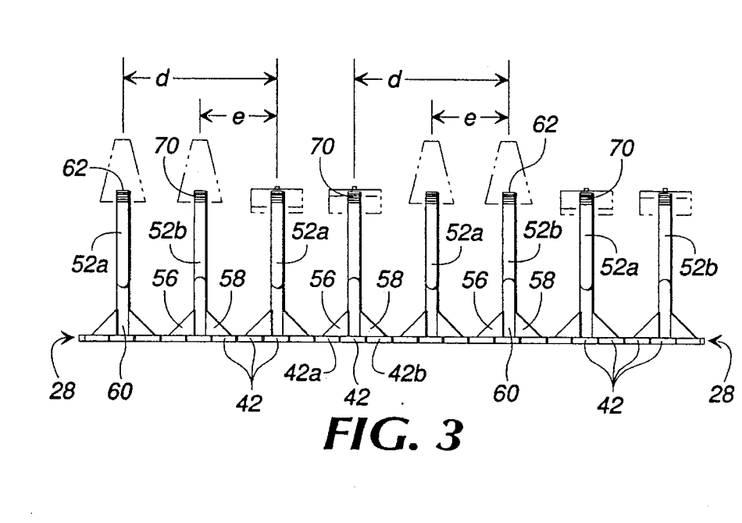
FIG. 3 is an isolated, side view of the section of the deboning-conveyor shown in FIG. 2.

FIG. 3 is an isolated, side view of the section of deboning-conveyor 12 shown in FIG. 2 and shows an interval "d" between successive, same-side-offset, support arms 52a–52a, 52b–52b. The distance between adjacent support arms 52a–52b, 52b–52a is shown as interval "e". The interval "d" is, preferably, chosen by reference to acceptable industry practice for the spacing of birds along a deboning-conveyor. The interval "e" is, preferably, chosen as one-half the distance "d". Thus, by way of example, where, by reference to industry practice, one determines that an efficient distance for spacing between birds on a deboning-conveyor is nine (9) inches, then, in accordance with the present invention, an acceptable interval "d" is 9 inches and an acceptable interval "e" is 4.5 inches. FIG. 3 also displays first support arm end 60 and second support arm end 62 for each support arm 52. First support arm end 60 is rigidly attached to link 42, for example, by welding, so that support arm 52 cannot move relative to link 42. Second support arm end 62 has external threads 70 and provides a connection site for a support fitting 54. To provide additional rigidity and maintain the fixed relationship of support arm 52 to link 42, first gusset 56 and second gusset 58 are attached to support arm 52, for example, by welding, near first support arm end 60. Note, however, that adjacent links 42a, 42b are pivotally connected to link 42 to form the stainless steel conveyor bed 28. Note also, that gussets 56, 58 merely overlap and do not attach to links 42, 42a, 42b so that the links may pivot relative to one another. By overlapping the links 42, 42a, 42b and being attached to the support arms 52, the gussets 56,58 limit the movement, for example, of the second support arm end 70 of support arm 52a about first support arm end 60 toward support arms 52 b (such movement also known as "deflection of the support arm 52"), thereby providing the additional rigidity and maintenance of the fixed relationship, referred to above, by reducing deflection of the support arms 52. Thus, due to their inherent function in reducing deflection of the support arms 52, the gussets 56,58 function as deflection reduction members.

Figure 4:
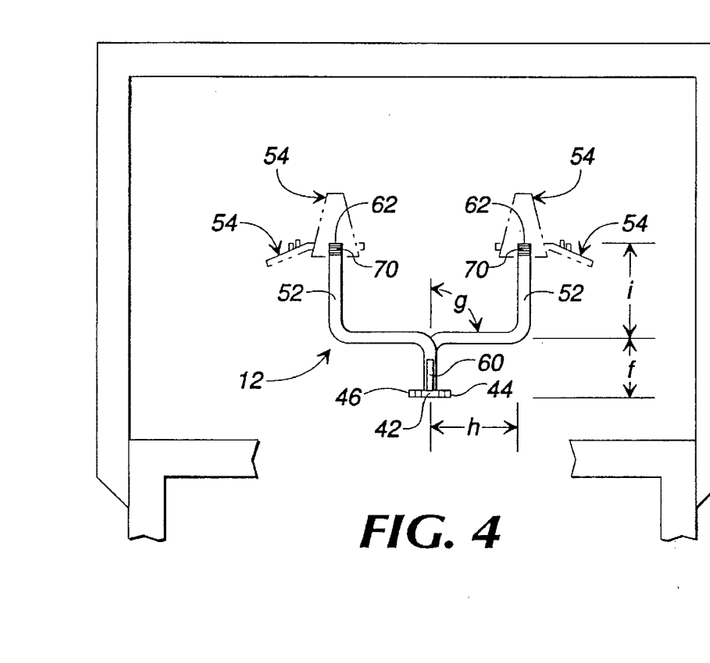
FIG. 4 is an isolated, end view of the section of the deboning-conveyor shown in FIG. 2.

FIG. 4 is an isolated, end view of the section of deboning-conveyor 12 shown in FIG. 2 and displays the unique "offset" shape of the support arms 52 in accordance with the preferred embodiment of the present invention. Starting at its point of attachment with link 42, support arm 52 rises vertically for a distance "f" from first support arm end 60. After rising vertically, support arm 52 then turns an angle "g" toward link edge 44 or opposite link edge 46 and extends for a distance "h". Once again, support arm 52 turns in a different direction, but this time, back into the vertical direction where it rises a distance "i" until reaching second support arm end 62. As discussed above, support arm 52 is then capped at second support arm end 62 with removable support fitting 54. In accordance with the preferred embodiment of the present invention, support fitting 54 is connected to second support arm end 62 by screwing external threads 70 of second support arm end 62 into threaded bore 96 of support fitting 54.

When selecting dimensions "f", "g", "h", and "i" of support arm 52 in accordance with the present invention, the following criteria/factors are preferably considered. First, a minimum dimension "f" is, preferably, chosen by reference to acceptable industry standard sizes for gussets 56, 58. Since gussets 56, 58 are rigidly attached to support arm 52 at first support arm end 60, a minimum value for dimension "f" must be slightly greater than the length of the vertical legs of the selected gussets. On the other hand, a maximum dimension "f" is, preferably, chosen by reference to structural computations to minimize the stress on the joint between first support arm end 60 and link 42. Second, dimension "h" and angle "g" are, preferably, chosen by reference to the width of the links 42 and the width of wear strips 30, as measured in accordance with industry convention, so that support fittings 54 are brought closer to the workers. Dimension "h" and angle "g" are, preferably, selected so that support arm 52 extends to a location proximate to side 16, 18 of deboning-conveyor 12 before turning back into the vertical direction. Locations proximate to side 16, 18 include, but are not limited, to those locations closer to side 16, 18 than to the longitudinal centerline of conveyor bed 28 as defined in the industry. Using this criteria, the value obtained by multiplying dimension "h" by the trigonometric sine of angle "g" is, preferably, greater than one-half of the width of link 42 added to the thickness of wear strip 30. Third, once values for dimension "f" and angle "g" have been decided upon, dimension "i" is then determined and in doing so, it is important to remember that workers must be able to easily reach the top of the deboning cones 64. Therefore, dimension "i" is, preferably, computed by subtracting the value of dimension "f", the height of an industry standard, deboning cone 64, and the distance from the floor to the top 24 of conveyor bed 28 from an acceptable working height determined by reference to industry standards.

Figure 5:
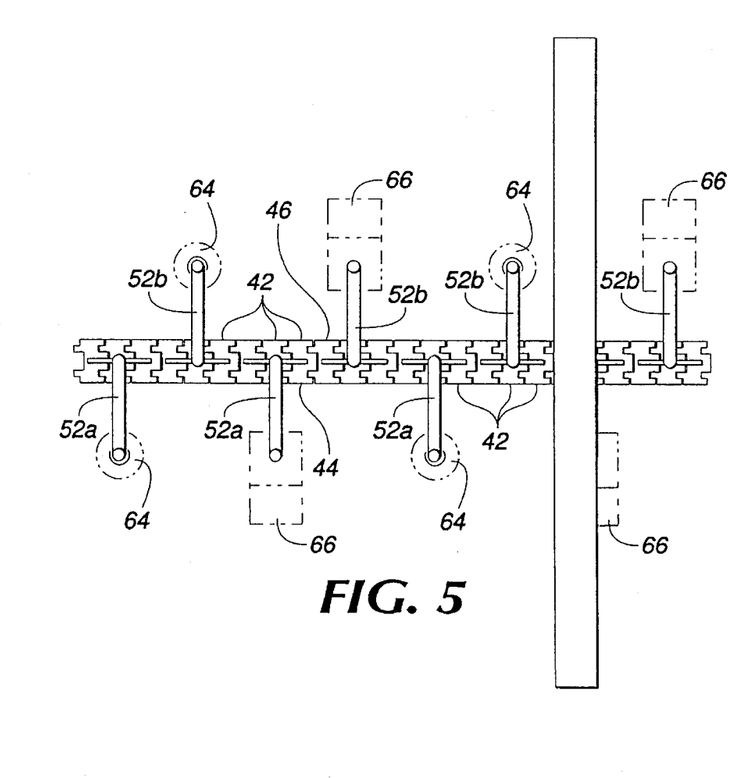
FIG. 5 is an isolated, top view of the section of the deboning-conveyor shown in FIG. 2.

FIG. 5, which is an isolated, top view of the section of deboning-conveyor 12 shown in FIG. 2 illustrates how each support arm 52 extends beyond either link edge 44 or opposite link edge 46 in accordance with the preferred embodiment of the present invention. In turn, deboning cones 64 and deboning half-pads 66 are mounted to support arms 52 beyond link edges 44, 46. FIG. 5 also displays the alternating orientation of support arms 52*a*, *b* and the alternating use of deboning cones 64 and deboning half-pads 66 as discussed above in reference to FIG. 2.

Figure 6:
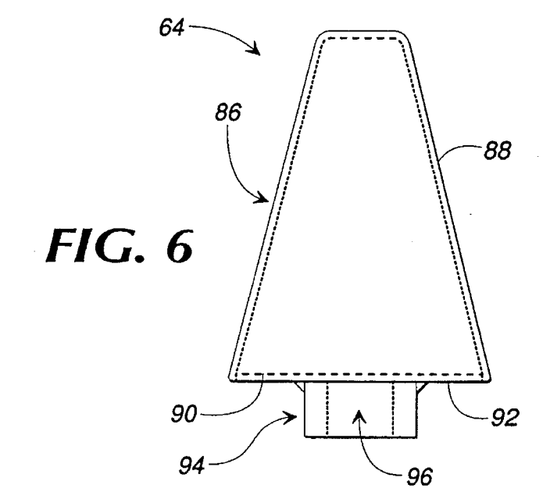
FIG. 6 is an isolated, side view of a deboning cone.

FIG. 6 is an isolated, side view of deboning cone 64 in accordance with the preferred embodiment of the present invention. Deboning cone 64 is constructed from stainless steel parts and is hollow. Deboning cone 64 includes upper portion 86 that provides a truncated, cone-shaped, mating surface 88 over which the inner, gutted cavity of a bird carcass is placed by a worker. As necessary, workers may swivel the bird carcass around mating surface 86 in order to perform various tasks on the carcass. Upper portion 86 is hollow and defines a circular opening 90 into which circular base plate 92 is rigidly attached, for example, by welding. To provide the ability to connect deboning cone 64 to support arms 52 (see FIG. 2), nut 94 has an internally threaded bore 96. Nut 94 is, in turn, rigidly attached, for example, by welding at the center of base plate 92.

Figure 7:
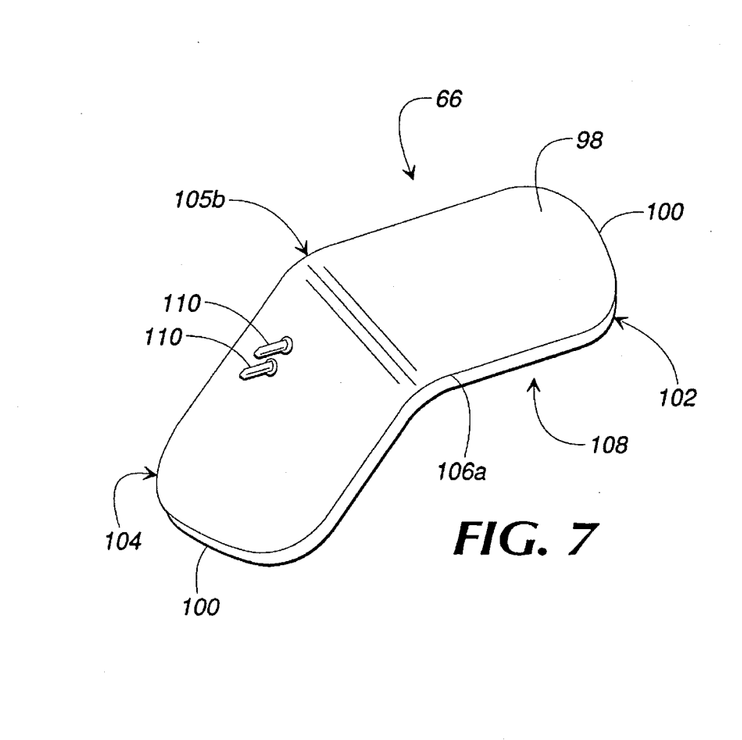
FIG. 7 is isolated, side, perspective view of a deboning half-pad.

FIG. 7 is an isolated, side, perspective view of deboning half-pad 66 in accordance with the preferred embodiment of the present invention. Deboning half-pad 66 is formed from a rectangular shaped, stainless steel plate 98, but has rounded short sides 100. Plate 98 is divided into upper portion 102 and lower portion 104 by bending along a line that extends from the midpoint of long side 106*a* to the midpoint of long side 106*b*. Upper portion 102 includes a threaded bore (not shown) for connection to support arms 52 (see FIG. 2). The threaded bore (not shown) is centered in bottom surface 108 of upper portion 102 and extends through bottom surface 108, but only partially into upper portion 102. FIG. 7 also displays two, sharp-pointed pegs 110 rigidly attached, for example, by welding, to lower portion 104. Pegs 110 restrain a bird portion while lower portion 104 provides a cutting board surface for workers to cut against when removing bone or cartilage from a bird portion.

Figure 8:
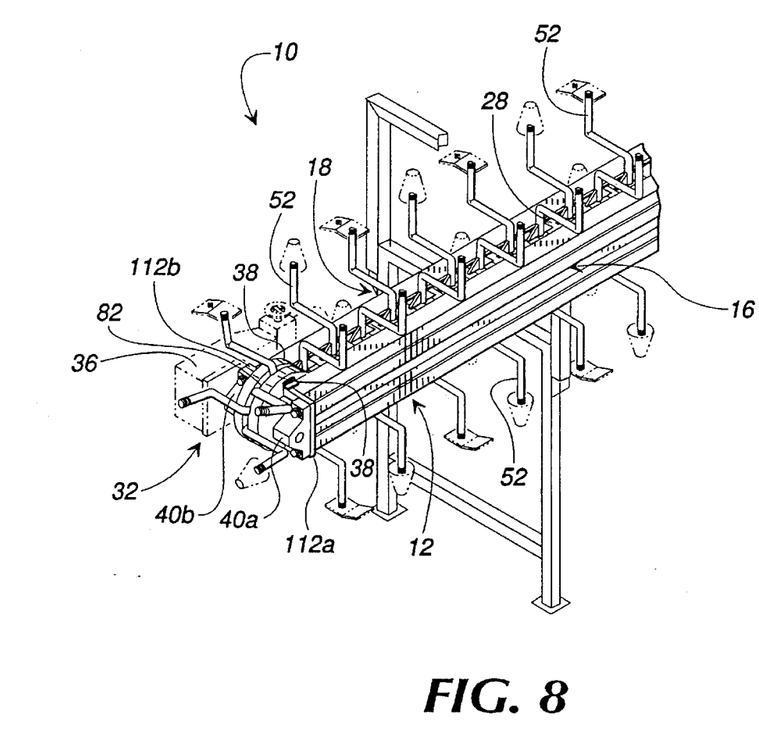
FIG. 8 is a side, perspective view of the drive end of the deboning apparatus of FIG. 1.

FIG. 8 is an isolated, side, perspective view of the drive end of deboning apparatus 10 in accordance with the preferred embodiment of the present invention. (Note, FIG. 8 is identical to a portion of the drawing of FIG. 1 and has been repeated here to present component numbers without cluttering FIG. 1) The figure shows a motor and drive assembly 32 that preferably includes an industry standard, variable speed motor and gear box combination 36, an industry standard sprocket (not shown), and bearings 40. In accordance with the preferred embodiment of the present invention, the motor-gear box 36 is secured to side 18 of deboning-conveyor 12 at drive end 20 (more clearly seen in FIG. 11) and has an output shaft (not shown) that extends from motor-gear box 36 across drive end 20 of deboning-conveyor 12. The output shaft (not shown) is rotatably held in place by bearing 40*a* on side 16 and bearing 40*b* on side 18. Bearings 40*a,b* are rigidly mounted on bearing mounting plates 112*a,b*. Centered between bearings 40*a,b* and rigidly attached to the output shaft (not shown) is a sprocket (not shown) that rotates at the same rate as the output shaft (not shown) when motor-gear box 36 is operating. A portion of the sprocket's teeth (not shown) engage conveyor bed 28 as the sprocket (not shown) rotates, causing conveyor bed 28 to move as discussed below. To prevent possible injury to persons standing near drive end 20 of deboning-conveyor 12, cover 38 is located over the exposed portions of the output shaft (not shown), sprocket (not shown), and conveyor bed 28 and defines a channel 82 through which support arms 52 pass while encircling drive end 20.

Figure 9:
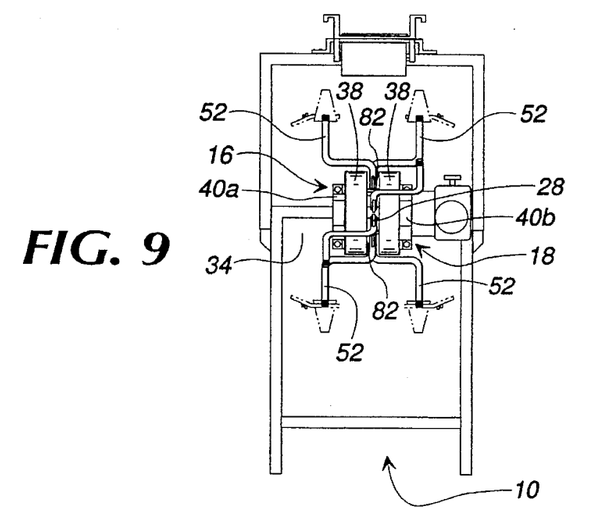
FIG. 9 is an end view of the tail end of the deboning apparatus of FIG. 1.

FIG. 9 is an end view of tail end 22 of deboning apparatus 10 of FIG. 1 and displays return pulley assembly 34 which changes the direction of travel of and maintains tension in conveyor bed 28. In accordance with the preferred embodiment of the present invention, a shaft (not shown) extends across tail end 22 (see FIG. 1) of deboning-conveyor 12 and is rotatably held in place by bearing 40*a* on side 16 and bearing 40*b* on side 18. Centered between bearings 40*a*, 40*b* and rigidly attached to the shaft (not shown) is a sprocket (not shown) having a number of teeth (not shown) that engage conveyor bed 28. In accordance with the preferred embodiment of the present invention, cover 38 located over the exposed portions of the shaft (not shown), sprocket (not shown), and conveyor bed 28 defines a channel 82 through which support arms 52 pass while encircling tail end 22 (see FIG. 1).

Figure 10:
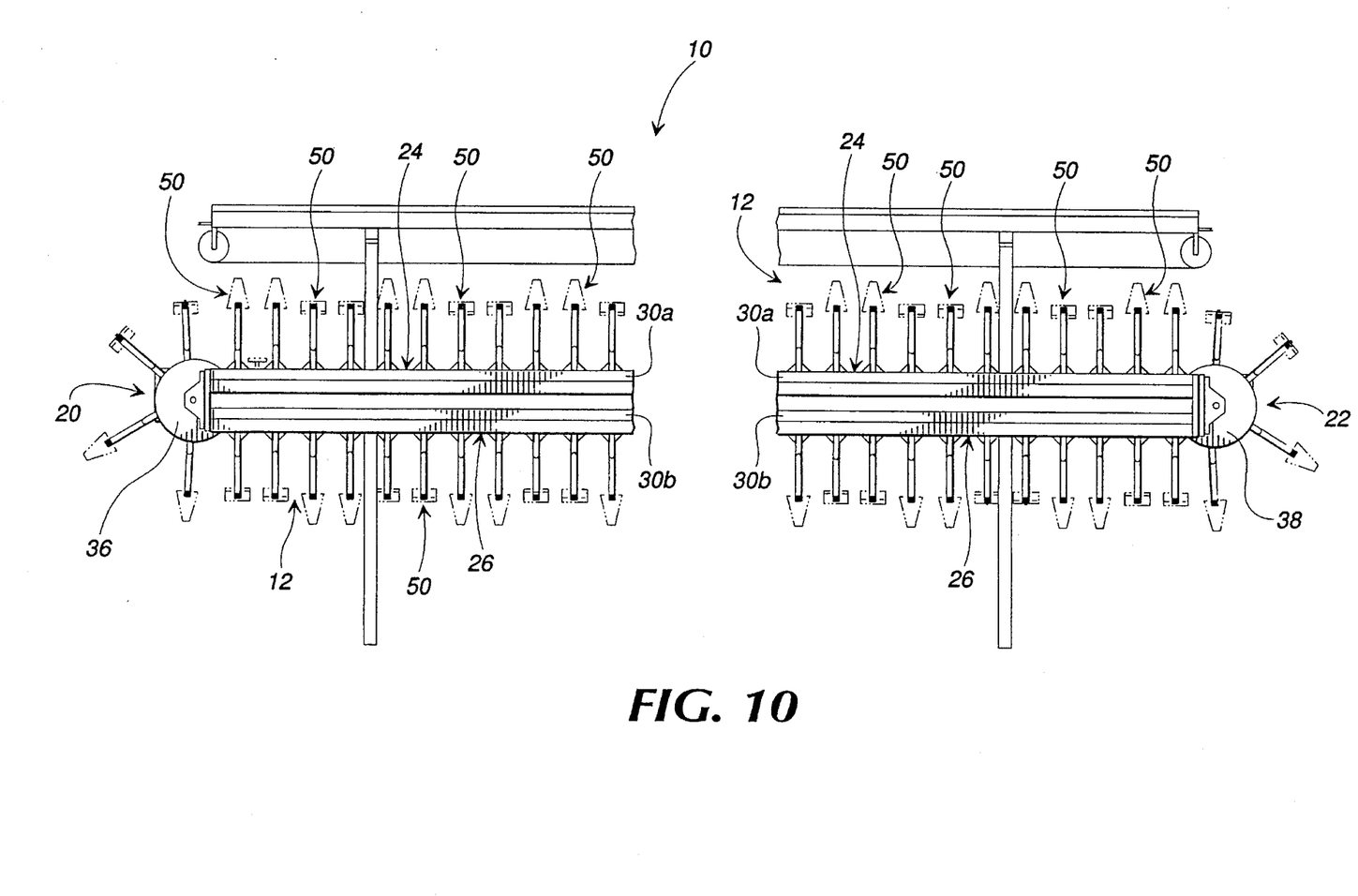
FIG. 10 is a side view of the deboning apparatus of FIG. 1.

FIG. 10 is a side view of deboning apparatus 10 of FIG. 1 with the center section removed. In accordance with the preferred embodiment of the present invention, poultry support assemblies 50 traverse top 24 moving, for example, toward drive end 20 and return along bottom 26 moving toward tail end 22 of deboning-conveyor 12. Poultry support assemblies 50 also pass through channels 82 (see FIGS. 8 and 9) defined by covers 38 as they encircle drive end 20 and tail end 22. As discussed below, an elongated groove (not shown) in wear strips 30*a,b* extends from drive end 20 to tail end 22 of deboning-conveyor 12 and provides a stabilizing channel in which conveyor bed 28 (see FIG. 1) travels.

Figure 11:
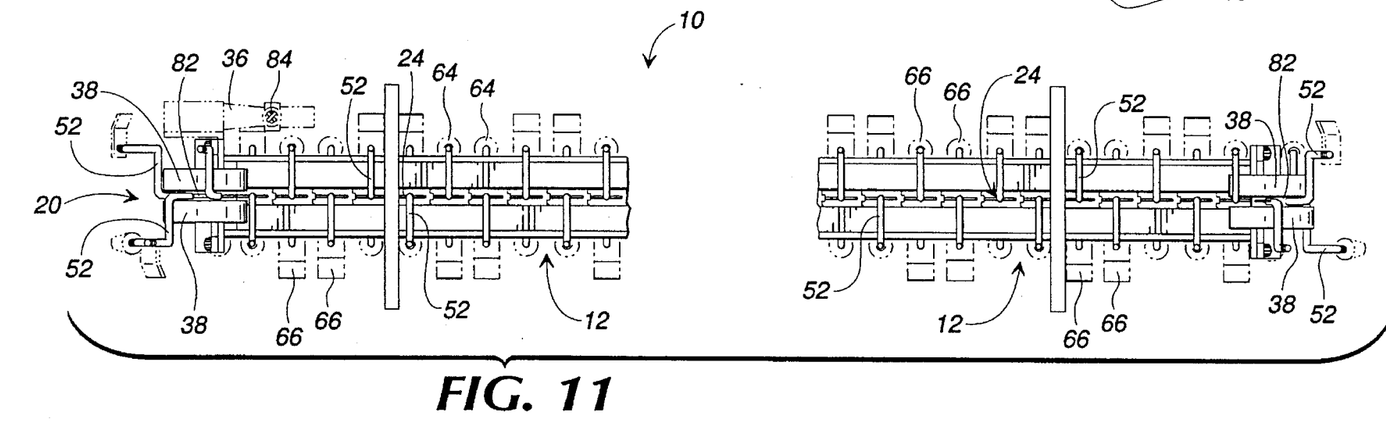
FIG. 11 is a top view of the deboning apparatus of FIG. 1.

FIG. 11 is a top view of deboning apparatus 10 of FIG. 1 with the center section removed and conveyor bed 28 shifted to more clearly display deboning cones 64 and deboning half-pads 66 on top 24 and bottom (not shown) of deboning-conveyor 12. If conveyor bed 28 was not shifted in the figure, deboning cones 64 and deboning half-pads 66 on top 24 would be seen superimposed on top of their counterparts on bottom (not shown) and the figure would be confusing. Also, FIG. 11 more clearly shows the location of motor-gear box 36 and control 84 at drive end 20 of deboning-conveyor 12 as discussed above in reference to FIG. 8. In addition, FIG. 11 shows support arms 52 passing through channels 82 defined by covers 38.

Figure 12:
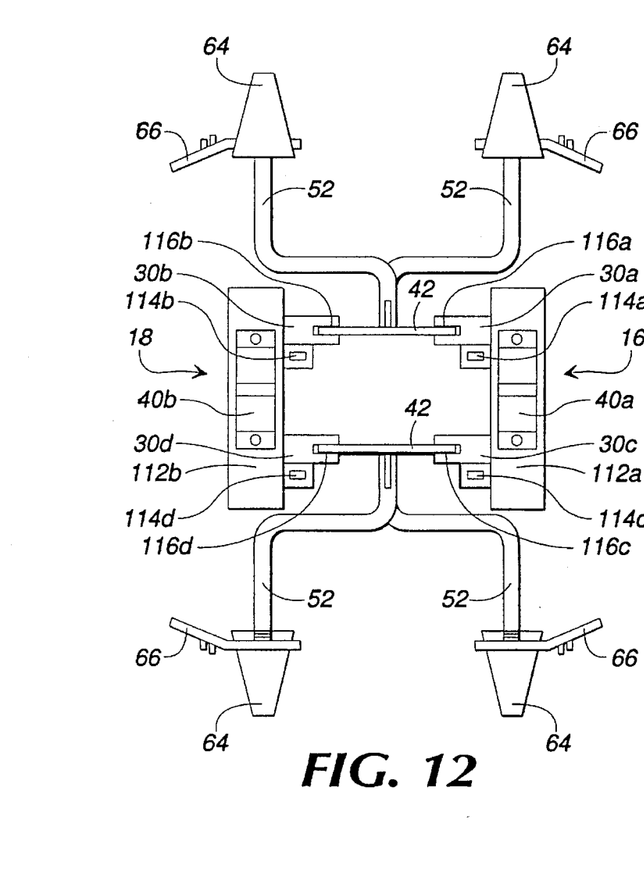
FIG. 12 is an isolated, end view of the drive end of the deboning apparatus of FIG. 1.

FIG. 12 is an isolated, end view of the drive end 20 of deboning conveyor 12 of FIG. 1 that displays the location of wear strips 30a,b,c,d and tube steel frame members 114a, b,c,d. As shown in FIG. 1, wear strips 30a,b,c,d extend the entire length of deboning conveyor 12 and form elongated edges that define the location of sides 16, 18. Wear strips 30a,b,c,d are supported by tube steel frame members 14a, b,c,d that also extend the entire length of deboning conveyor 12 and form an elongated frame. FIG. 12 also illustrates wear strip grooves 116a,b,c,d that form an elongated path in which links 42 of conveyor bed 28 ride. For reference purposes, bearing mounting plates 112a,b, bearings 40a,b, and support arm 52 are shown as well.

Referring back to FIG. 1, in accordance with the preferred embodiment of the present invention, the motor and drive assembly 32 effects movement of conveyor bed 28 when electrical power is suppled to motor-gear box 36. The speed at which conveyor bed 28 travels is adjusted via a control 84 (see FIG. 11) on motor-gear box 36 (see FIGS. 8 and 11) with the speed being measured in terms of how many birds pass a point on deboning-conveyor 12 every minute. The speed is chosen by reference to the experience of the user and his work force, with a goal toward optimizing worker performance, production capacity, and quality.

Still referring back to FIG. 1, conveyor bed 28 is pulled by the operation of motor and drive assembly 32 so that it travels along top 24 of deboning-conveyor 12 from tail end 22 to drive end 20. As links 42 (see FIG. 2) of conveyor bed 28 traverse top 24 of deboning-conveyor 12, link edges 44 (see FIG. 2) ride in wear strip groove 116a (see FIG. 12) defined by wear strip 30a and extending along side 16. Likewise, link edges 46 (see FIG. 2) ride in a wear strip groove 116b (see FIG. 12) defined by wear strip 30b and extending along opposite side 18 of deboning-conveyor 12. Movement of conveyor bed 28 in this way causes poultry support assemblies 50 to travel from tail end 22 to drive end 20, thereby bringing poultry support fittings 54 (see FIG. 2) past workers that stand along the entire length of deboning-conveyor 12 and face side 16 or opposite side 18. Using a sharp knife, each worker cuts and/or removes certain parts of a bird from the carcass or portion riding on a poultry support fitting 54 (see FIG. 2). Since the arrangement and sequencing of poultry support fittings 54 (see FIG. 2) appears identical to a worker standing at the same relative location on side 16 or opposite side 18, each worker on side 16 is capable of performing the same task as each worker standing at the corresponding location on opposite side 18.

Preferably, a bird carcass or portion is stripped of all useable products and is completely deboned by the time it reaches drive end 20 of deboning-conveyor 12. In accordance with a preferred method of the present invention, all that remains of the bird is the skeleton which is knocked off deboning cone 64 (see FIG. 2) as conveyor bed 28 wraps around the sprocket (not shown) of return pulley assembly 34 to start its return path toward tail end 22 along bottom 26 of deboning-conveyor 12. As links 42 (see FIG. 2) of conveyor bed 28 traverse bottom 26, link edges 44 (see FIG. 2) ride in wear strip groove 116c (see FIG. 12) defined by wear strip 30c (see FIG. 12) and extending along side 16. In similar fashion, link edges 46 ride in wear strip groove 116d (see FIG. 12) defined by wear strip 30d (see FIG. 12) and extending along opposite side 18 of deboning-conveyor 12.

Still referring back to FIG. 1, once conveyor bed 28 completes its return to tail end 22, links 42 (see FIG. 2) encircle the sprocket (not shown) of return pulley assembly 34 and transition from bottom 26 to top 24 of deboning-conveyor 12. During this transition, empty deboning cones 64 (see FIG. 2) rise up from bottom 26 of deboning-conveyor 12 and pass before a worker, known as a loader, who, in accordance with the preferred embodiment of the present invention, places a bird carcass on each deboning cone 64 (see FIG. 2) by placing the bird's internal cavity over deboning cone 64 (see FIG. 2). Owing to the unique nature and arrangement of support assemblies 50, the loader, in accordance with a first preferred embodiment of the present invention, is presented with a deboning cone 64 (see FIG. 2) on one side (for example, side 16) of deboning-conveyor 12. After placing a bird carcass over this deboning cone 64 (see FIG. 2), the loader then places a bird carcass over another deboning cone 64 (see FIG. 2) that has appeared on the opposite side (for example, side 18) of deboning-conveyor 12. Next, the loader allows two deboning half-pads 66 (see FIG. 2) to pass by, one on side 16 and another on opposite side 18. Then, the loader is presented again with a deboning cone 64 on side 16 of deboning-conveyor 12 and the process continues in repetitive fashion. Thus, in accordance with the preferred embodiment of the present invention, one worker loads all the bird carcasses that are processed on side 16 and opposite side 18 of deboning-conveyor 12. When the transition from bottom 26 to top 24 is complete, conveyor bed 28 once again begins to travel from tail end 22 toward drive end 20 and the above deboning method is repeated as long as electrical power is applied to motor-gear box 36 (see FIG. 8).

The present invention lends itself to a variety of detailed deboning methods. As seen in FIG. 2, support fittings 54 are arranged in alternating fashion in accordance with the preferred embodiment of the present invention, each worker is presented repetitively with pairs of support fittings 54 including, but not limited to, a deboning cone 64 followed immediately by a deboning half-pad 66. In accordance with a preferred and more detailed deboning method, each worker performs at least two tasks with respect to each deboning cone 64 and deboning half-pad 66 pair.

In accordance with the preferred method and still referring to FIG. 2, when deboning cone 64 reaches a worker's station, it is already loaded with a bird carcass and the worker first performs one or more tasks on the bird carcass. Typically, such tasks include, but are not limited to: scoring the bird's back; cutting and removing leg quarters, thighs, drums, and wings; pulling breast meat or tenders; and removing skin or fat. By the time the worker finishes, conveyor bed 28 has advanced enough to bring deboning half-pad 66 into reach of the same worker. If deboning half-pad 66 is empty and not restraining a bird portion such as a leg quarter, thigh, or leg, the worker's second task would involve simply placing the portion removed during the worker's first task over pegs 76 (see FIG. 7) of deboning half-pad 66 to restrain the portion for subsequent deboning and secondary processing. In the alternative, a worker's second task may be totally unrelated to the first task and involve deboning or other secondary processing on a portion previously placed over pegs 76 (see FIG. 7) at an earlier station along deboning-conveyor 12. With each worker performing at least two tasks in this way, the bird carcass on deboning cone 64 is stripped of all usable products by the time it reaches drive end 20 (see FIG. 1) of deboning-conveyor 12 and subsequent, off-line, secondary deboning of portions is eliminated since it is accomplished on deboning half-pads 66.

Figure 13:
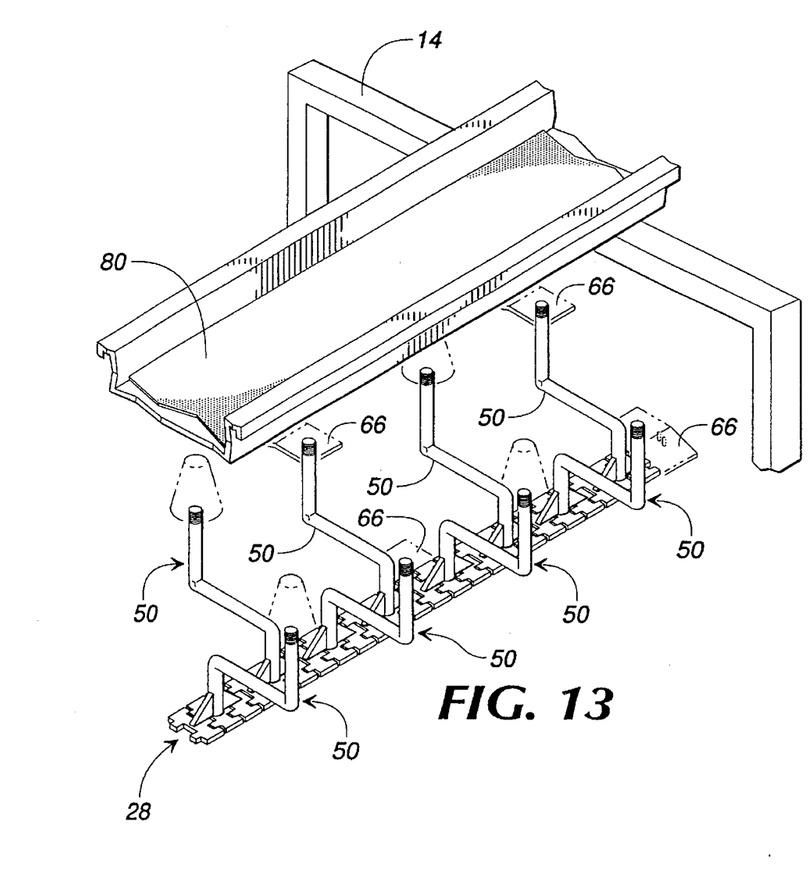
FIG. 13 is an isolated, side, perspective view of a typical section from the top of the deboning-conveyor described in the first alternate embodiment.

A first alternate embodiment of the present invention is depicted in FIG. 13 as an isolated, side, perspective view of a typical section removed from top 24 of deboning-conveyor 12 shown in FIG. 1. The addition of products-conveyor 80 above conveyor bed 28 distinguishes the first alternate embodiment from the preferred embodiment of FIGS. 1 and 2. Products-conveyor 80 is an industry standard, continuous belt conveyor and is centered between sides 16, 18 (see FIG. 1) over conveyor bed 28. Products-conveyor 80 is rigidly attached to conveyor support frames 14 that are positioned periodically along the length of deboning-conveyor 12 (see FIG. 1). Another alternate embodiment of the present invention includes suspending products-conveyor 80 from conveyor support frames 14 so that products-conveyor 80 hangs between poultry support assemblies 50.

In operation, as workers at various stations along deboning-conveyor 12 (see FIG. 1) remove products from a bird carcass or complete the processing of a portion on deboning half-pad 66, the products and portions are placed on products-conveyor 80 for transport to a secondary processing or packaging area. Because products-conveyor 80 is centered between side 16 (see FIG. 1) and opposite side 18 (see FIG. 1), it is easily reached by workers on either side 16, 18 (see FIG. 1) of deboning-conveyor 12 (see FIG. 1).

Figure 14:
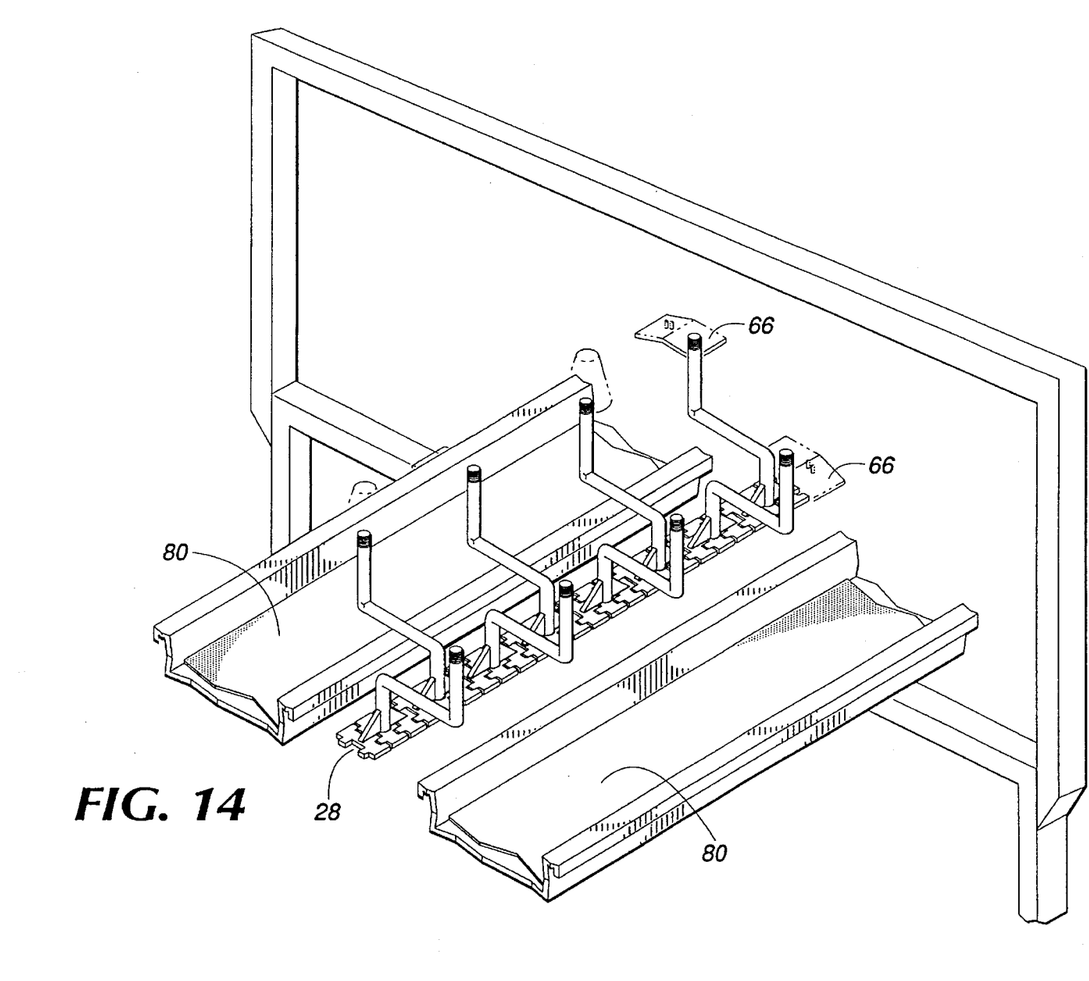
FIG. 14 is an isolated, side, perspective view of a typical section from the top of the deboning-conveyor described in the second alternate embodiment.

A second alternate embodiment of the present invention is depicted in FIG. 14 as an isolated, side, perspective view of a typical section removed from top 24 of deboning-conveyor 12 shown in FIG. 1. This second alternate embodiment is distinguished from the preferred embodiment by the addition of products-conveyors 80 on both sides of deboning-conveyor 12 (see FIG. 1). With respect to FIG. 13, industry standard, continuous belt products-conveyors 80 are located adjacent to conveyor bed 28 of deboning-conveyor 12 (see FIG. 1). Products-conveyors 80 are rigidly attached to conveyor support frames 14 which are positioned periodically along the length of deboning-conveyor 12 (see FIG. 1).

As in the first alternate embodiment above, workers removing products from a bird carcass or completing the processing of a portion on deboning half-pad 66 place products on products-conveyors 80 for transport to a secondary processing or packaging area. However, in this second alternate embodiment, two products-conveyors 80 are used instead of one. Because products-conveyors 80 are located adjacent to side 16 (see FIG. 1) and opposite side 18 (see FIG. 1) of deboning-conveyor 12 (see FIG. 1), a worker may remove a product and merely drop it onto products-conveyors 80 without any lost motion by the worker.

A third alternate embodiment of the present invention is distinguished from the preferred embodiment of FIGS. 1 and 2 by fitting every support arm 52 with deboning cones 64. By doing so, the production capacity of the deboning-conveyor 12 of the preferred embodiment is doubled, but at the expense of having to debone bird portions in off-line, secondary processing areas.

A fourth alternate embodiment of the present invention is distinguished from the preferred embodiment of FIGS. 1 and 2 by fitting every support arm 52 with deboning half-pads 66. This configuration enables deboning-conveyor 12 to be used in lieu of or in addition to secondary processing equipment. However, no bird carcasses could be processed with deboning half-pads 66 in place.

Whereas this invention has been described in detail with particular reference to a preferred embodiment and alternate embodiments thereof, it will be understood that variations and modifications can be effected within the spirit and scope of the invention, as described herein before and as defined in the appended claims.

I claim:

1. An apparatus for facilitating the processing of poultry comprising:

an elongated frame;

a continuous conveyor movably supported by said frame for movement along an elongated path and including an elongated edge;

a support means for supporting poultry, wherein said support means is connected to said continuous conveyor and supports poultry proximate to said elongated edge; and said support means including, at least, a support arm member connected to and extending from said continuous conveyor, wherein said support arm member rises from said continuous conveyor, then turns into a vertical plane perpendicular to the longitudinal centerline of said continuous conveyor and generally toward said elongated edge, then turns into the vertical direction, and a support fitting connected to said support arm member.

2. An apparatus for facilitating the processing of poultry comprising:

an elongated frame;

a continuous conveyor movably supported by said frame for movement along an elongated path and including, at least, a first elongated edge and a second elongated edge;

a plurality of support arm members wherein,
each said support arm member of said plurality of support arm members extends from said continuous conveyor, and
each said support arm member includes, at least, a first end and a second end, said first end being attached to said continuous conveyor; and a plurality of support fittings wherein,
each said support fitting of said plurality of support fittings attaches to said second end of one of said support arm members of said plurality of support arm members, and
said plurality of support fittings includes, at least,
a first plurality of support fittings proximate to said first elongated edge, and
a second plurality of support fittings proximate to said second elongated edge.

3. The apparatus of claim 2, further comprising
a deflection reduction member connected to and extending from each of said support arm members.

4. The apparatus of claim 3, wherein, at least a portion of said deflection reduction member contacts at least a portion of said continuous conveyor upon sufficient deflection of each of said support arm members, whereby deflection of each of said support arm members is limited.

5. The apparatus of claim 4, wherein said poultry support includes, at least, a first portion that rises from said continuous conveyor, said first portion of each of said support arm members being connected to a portion of said deflection reduction member.

6. The apparatus of claim 3, wherein,
said continuous conveyor includes, at least, a first link member, wherein each of said support arm members is connected to said first link member, and a second link member interconnected to said first link member, and a portion of said deflection reduction member contacts, at least, said first link member upon sufficient deflection of each of said support arm members, whereby deflection of each of said support arm members is limited.

7. The apparatus of claim 6, wherein, at least a portion of said deflection reduction member extends at least partially over said first link member.

8. The apparatus of claim 6, wherein, at least a portion of said deflection reduction member extends at least partially over said second link member.

9. The apparatus of claim 6, wherein said deflection support member is a triangular-shaped, gusset.

10. The apparatus of claim 6, wherein, said deflection reduction member is a first deflection reduction member and said apparatus further includes, at least, a second deflection reduction member connected to and extending from each of said support arm members, said continuous conveyor further includes, at least, a third link member interconnected to said first link member, and said second deflection reduction member contacts, at least, said first link member upon sufficient deflection of each of said support arm members, whereby deflection of each of said support arm members is limited.

11. The apparatus of claim 10, wherein at least a portion of said second deflection reduction member extends at least partially over said first link member.

12. The apparatus of claim 10, wherein, at least a portion of said second deflection reduction member extends at least partially over said third link member.

13. The apparatus of claim 10, wherein said second deflection support member is a triangular-shaped, gusset.

14. An apparatus for facilitating the processing of poultry comprising:

an elongated frame;

a continuous conveyor movably supported by said frame for movement along an elongated path and including, at least, a first elongated edge and a second elongated edge;

a plurality of support arm members wherein, each said support arm member of said plurality of support arm members connects to and extends from said continuous conveyor, and said plurality of support arm members includes, at least, a first plurality of support arm members, and a second plurality of support arm members wherein, adjacent support arm members of said second plurality of support arm members are interposed between adjacent support arm members of said first plurality of support arm members; and a plurality of support fittings including, at least, a first plurality of support fittings proximate to said first elongated edge, each of said first plurality of support fittings being connected to one of said first plurality of support arm members, and a second plurality of support fittings proximate to said second elongated edge, each of said second plurality of support fittings being connected to one of said second plurality of support arm members.

15. The apparatus of claim 14, wherein, each support arm member of said first plurality of support arm members rises from said continuous conveyor, then turns into vertical plane perpendicular to the longitudinal centerline of said continuous conveyor and generally toward said first elongated edge, then turns into the vertical direction, and support arm member of said second plurality of support arm members rises from said continuous conveyor, then turns into a vertical plane perpendicular to the longitudinal centerline of said continuous conveyor and generally toward said second elongated edge, then turns into the vertical direction.

16. The apparatus of claim 14, wherein each of said first and second plurality of support fittings includes, at least, a plurality of poultry carcass support members, and a plurality of poultry portion support members.

17. The apparatus of claim 16, wherein adjacent poultry support members of each of said first and second plurality of support fittings are interposed between adjacent poultry carcass support members of said first and second plurality of support fittings.

18. The apparatus of claim 14, wherein each support fitting of said first and second plurality of support fittings is a poultry carcass support member, whereby a poultry carcass is positioned by each support fitting for processing.

19. The apparatus of claim 14, wherein each support fitting of said first and second plurality of support fittings is a poultry portion support member, whereby a poultry portion is positioned by each support fitting for processing.

20. The apparatus of claim 14, wherein, said first plurality of support fittings includes, at least, a plurality of poultry carcass support members, and said second plurality of support fittings includes, at least, a plurality of poultry portion support members.

21. An apparatus for facilitating the processing of poultry comprising:

an elongated frame;

a continuous conveyor movably supported by said elongated frame for movement along an elongated path, wherein said continuous conveyor includes, at least, a first elongated edge, and a second elongated edge; and a plurality of support fittings supported by and movable with said continuous conveyor wherein, each said support fitting supports the center of mass of the poultry at a position laterally offset from the longitudinal centerline of said continuous conveyor, said plurality of support fittings includes, at least, a first plurality of support fittings proximate to said first elongated edge, and a second plurality of support fittings proximate to said second elongated edge, and each of said first and second plurality of support fittings includes, at least, a plurality of poultry carcass support members, and a plurality of poultry portion support members, wherein adjacent poultry portion support members of each of said first and second plurality of support fittings are interposed between adjacent poultry carcass support members of said first and second plurality of support fittings.

22. The apparatus of claim 21, wherein said apparatus further includes, at least, a plurality of support arm members, wherein each support arm member of said plurality of support arm members is connected between said continuous conveyor and one of said support fittings from one of said first and second plurality of support fittings.

23. The apparatus of claim 22, wherein said plurality of support arm members includes, at least, a first plurality of support arm members, and a second plurality of support arm members, wherein adjacent support arm members of said second plurality of support arm members are interposed between adjacent support arm members of said first plurality support arm members.

24. The apparatus of claim 23, wherein, each of said first plurality of support arm members is connected to one of said first plurality of support fittings, and each of said second plurality of support arm members is connected to one of said second plurality of support fittings.

25. The apparatus of claim 24, wherein, each support arm member of said first plurality of support arm members rises from said continuous conveyor, then turns into a vertical plane perpendicular to the longitudinal centerline of said continuous conveyor and generally toward said first elongated edge, then turns into the vertical direction, and each support arm member of said second plurality of support arm members rises from said continuous conveyor, then turns into a vertical plane perpendicular to the longitudinal centerline of said continuous conveyor and generally toward said second elongated edge, then turns into the vertical direction.

26. The apparatus of claim 24, wherein, said elongated frame further includes, at least, a first end and a second end, whereby a longitudinal direction of said continuous conveyor is defined in a direction from said first end to said second end of said elongated frame, and said support arm members of said first and second plurality of support arm members are located at regular intervals along the longitudinal direction of said continuous conveyor.

27. An apparatus for facilitating the processing of poultry comprising:

an elongated frame;

a continuous conveyor movably supported by said elongated frame for movement along an elongated path, wherein said continuous conveyor includes, at least, a first elongated edge, and a second elongated edge;

a plurality of support fittings supported by and movable with said continuous conveyor wherein, each said support fitting supports the center of mass of the poultry at a position laterally offset from the longitudinal centerline of said continuous conveyor, and said plurality of support fittings includes, at least, a first plurality of support fittings proximate to said first elongated edge, and a second plurality of support fittings proximate to said second elongated edge; and a plurality of support arm members wherein, each support arm member of said plurality of support arm members is connected between said continuous conveyor and one of said support fittings from one of said first and second plurality of support fittings, and said plurality of support arm members includes, at least, a first plurality of support arm members, each of said first plurality of support arm members being connected to one of said first plurality of support fittings, and a second plurality of support arm members, each of said second plurality of support arm members being connected to one of said second plurality of support fittings, wherein adjacent support arm members of said second plurality of support arm members are interposed between adjacent support arm members of said first plurality of support arm members.

28. The apparatus of claim 27, wherein each support arm member of said first and second plurality of support arm members includes, at least, a first end, and a second end, wherein said first end is connected to said continuous conveyor and said second end is connected to one support fitting of said first and second plurality of support fittings.

29. The apparatus of claim 28, wherein, each support arm member of said first plurality of support arm members rises from said continuous conveyor, then turns into a vertical plane perpendicular to the longitudinal centerline of said continuous conveyor and generally toward said first elongated edge, then turns into the vertical direction, and each support arm member of said second plurality of support arm members rises from said continuous conveyor, then turns into a vertical plane perpendicular to the longitudinal centerline of said continuous conveyor and generally toward said second elongated edge, then turns into the vertical direction.

30. The apparatus of claim 29, wherein each support fitting of said first and second plurality of support fittings is a poultry carcass support member, whereby a poultry carcass is positioned by each support fitting for processing.

31. The apparatus of claim 27, wherein each support fitting of said first and second plurality of support fittings is a poultry carcass support member, whereby a poultry carcass is positioned by each support fitting for processing.

* * * * *